United States Patent Office 3,544,528
Patented Dec. 1, 1970

3,544,528
PRODUCTION OF A POLYACYLOXAMIDRAZONE
Helmut Mägerlein, Erlenbach, Erhard Siggel, Seckmauern, Hans-Dieter Rupp and Michael Wallrabenstein, Erlenbach, Albert Schöpf, Hering, Odenwald, and Gerhard Meyer, Obernburg, Germany, assignors to Glanzstoff AG, Wuppertal, Germany
No Drawing. Filed Mar. 27, 1968, Ser. No. 716,364
Claims priority, application Germany, Oct. 31, 1967, G 51,497
Int. Cl. C08g 20/20, 20/22
U.S. Cl. 260—78        15 Claims

ABSTRACT OF THE DISCLOSURE

Process of producing a polyacyloxamidrazone characterized by recurring units of the formula

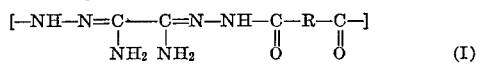

in which R is a divalent organic radical of 2 up to about 12 carbon atoms, preferably 2 to 6 carbon atoms, in an essentially hydrocarbon structure, e.g. 1,4-phenyl, by polycondensing oxalic acid bisamidrazone with an organic dicarboxylic acid chloride or bromide in a two phase solvent system of water and an inert organic solvent of at least 8% miscibility with water (g./100 ml. $H_2O$ at 20° C.), the two phases being produced by the addition of a salting out agent, and the reaction being carried out at temperatures of about 0° C. to 60° C. while mixing and withdrawing the heat of reaction and in the presence of an acid acceptor. The resulting polycondensate is a useful fiber-forming or filmaceous polymer product.

---

The polycondensations carried out by known processes in a one phase solvent system, e.g. in only one solvent as dimethylformamide or in two solvents which are completely miscible as dimethylformamide and pyridine result only polycondensates of lower molecular weight and render films and fibers with less satisfying technological properties.

This invention is concerned with the production of polyacyloxamidrazones by the polycondensation of two distinct monomeric components while splitting off HCl or HBr so as to essentially form a linear thermoplastic polycondensate containing the bisamidrazone structure in the linear chain. The polymers of the invention are distinguished by their content of amino groups ($-NH_2$) or imino groups ($-NH-$) at regular intervals in the polymer structure. More particularly the invention is directed to a method of producing very high molecular weight polyacyloxamidrazones which exhibit desirable film-forming or fiber-forming properties.

It is known that a wide variety of polymers are obtained by polycondensation of two monomeric components having difunctional reactive groups wherein a small molecule such as water, methanol, glycol or the like is split off, so as to produce high molecular weight linear chains consisting predominantly of a hydrocarbon structure. Polyamides, polyesters and polyethers are familiar examples of such polycondensates. The polycondensation is usually carried out at relatively high temperatures between an approximately equimolar ratio of the monomeric components, often with a catalyst, and in the substantial absence of water or other solvents. Such well known polymers often are not entirely satisfactory in specific applications, and there is still a need for polymers having unique properties and favorable characteristics, especially in terms of reactive sites on the polymer chain.

One object of the present invention is to provide an essentially linear polycondensate possessing valuable properties. Another object of the invention is to provide a novel polycondensation process in which a hydrogen halide is split off during polycondensation to form the linear polycondensate and in which a particular solvent system is employed for the regulation of molecular weight. These and other objects and advantages of the invention will become more apparent upon consideration of the following detailed disclosure.

It has now been found, in accordance with the present invention, that a polyacyloxamidrazone with recurring units of the Formula I can be obtained by reacting oxalic acid bisamidrazone of the formula

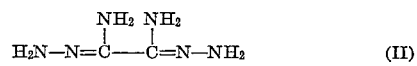

with an organic dicarboxylic acid halide of the formula

in which X is chlorine or bromine and R is a divalent hydrocarbon radical of at least 2 up to about 12, preferably 2 to 6, carbon atoms. The reaction is carried out in a two phase solvent medium consisting of water and an organic solvent which is inert to the dicarboxylic acid halide reactant and which is miscible with water in an amount of at least 8 grams per 100 ml. water, measured at 20° C. In order to produce two distinct phases of the solvent medium, it is essential that it contain a salting out agent sufficient to render the organic solvent substantially immiscible with the water. The reaction is also carried out with mixing and in the presence of an acid acceptor while withdrawing the heat of reaction so as to maintain a temperature of about 0° C. to 60° C., preferably about 10° C. to 40° C. The reaction product as a high molecular weight polycondensate is subsequently isolated from the solvent medium.

The oxalic acid bisamidrazone employed as one of the monomeric components has the formula

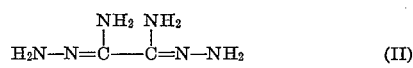

and can be obtained by reacting cyanogen gas (ethane dinitrile of the formula $N\equiv C-C\equiv N$) with hydrazine hydrate ($N_2H_4 \cdot H_2O$) in known manner. This reactant may sometimes be referred to as the "oxalic bisamidrazone." The other monomeric component is the organic dicarboxylic acid halide of the formula

where R and X have the meanings set forth above, particularly desirable results being obtained in the preparation of the polyacyloxamidrazones by using those dicarboxylic halides in which X is chlorine and R is a hydrocarbon radical of 2 to 12 and preferably 2 to 6 carbon atoms. The term "hydrocarbon radical" is employed herein with reference to aliphatic, cycloaliphatic, aryl and aralkyl members consisting essentially of carbon and hydrogen atoms without excluding the presence of a hetero atom such as oxygen, sulfur or nitrogen which does not materially affect the essential hydrocarbon nature of the divalent radical. The formation of the poly-acyloxamidrazone takes place by polycondensation of the two essential monomeric components with a splitting off of hydrogen halide.

Suitable dicarboxylic acid halides for the production of the polymers in accordance with the invention include, by way of example, the dichlorides and dibromides of the following organic dicarboxylic acids:
Adipic acid
Sebacic acid Succinic acid
Fumaric acid
Glutaric acid
1,4-cyclohexane dicarboxylic acid
Homoterephthalic acid
Isophthalic acid
Naphthalene dicarboxylic acid
p,p'-diphenylether dicarboxylic acid
Terephthalic acid.

Especially valuable products are obtained with the polycondensation of the oxalic bisamidrazone with terephthalic acid dichloride in approximately equimolar proportions.

Any conventional acid acceptor may be used in the polycondensation reaction, i.e. the usual technical acid-binding substances such as soda (sodium carbonate), sodium bicarbonate, pyridine and triethylamine. The acid acceptor is preferably a basic-reacting inorganic salt which is soluble in water as one of the liquid phases of the solvent system, but in general it is possible to use any organic or inorganic basic-reacting compound as explained more fully hereinafter.

The polycondensation of the oxalic acid bisamidrazone with the dicarboxylic acid halide according to the invention must be carried out in a liquid reaction medium which is essentially a two-phase solvent system, one of the phases being water and the other phase being an organic solvent which is a liquid miscible with water to the extent of at least 8 grams per 100 ml. $H_2O$, as measured at 20° C., and preferably an organic solvent which is normally fully miscible with water in any proportion. In order to provide two distinct phases, a salting out agent must be present in an amount which is sufficient to substantially completely reduce the miscibility of the inert organic solvent in the water, i.e. so as to render the organic solvent immiscible with water at the reaction temperatures. Each phase then acts as the solvent for one of the monomeric reaction components, and it is assumed that the reaction takes place primarily at the interfaces, i.e. the boundary surfaces between the two phases. The presence of an acid acceptor, which is preferably dissolved in the water or aqueous phase, is necessary in order to bind or tie up the hydrogen halide (HCl or HBr) which is split off during the polycondensation reaction.

Thus, one of the two phases consists essentially of an aqueous solution of the oxalic acid bisamidrazone containing the salting out agent and preferably also the acid acceptor, while the other phase consists essentially of a solution of the dicarboxylic acid halide in an inert organic solvent which fulfills the above-noted conditions. Suitable organic solvents include the following substances by way of example: tetrahydrofuran, ethyl acetate, hexamethylphosphoric acid triamide, dioxane, glycol carbonate, 1,2-dimethylglycol carbonate, oxalic acid diethyl ester (acetonitrile) and malonic acid diethyl ester. A skilled chemist can readily select these and other inert organic solvents based upon their solubilizing properties for the dicarboxylic acid halide as well as the extent to which they are miscible with water under normal conditions. Especially desirable results are achieved by using an organic solvent which is highly miscible with water and which preferentially dissolves the dicarboxylic acid halide, i.e. which does not act as a solvent for the oxalic acid bisamidrazone. For these and other reasons as discussed more fully below, tetrahydrofuran is particularly advantageous as the inert organic solvent.

The temperatures which are suitable for the polycondensation reaction lie between about 0° C. and 60° C., the temperature preferably being maintained in a range of about 10° C. to 40° C. The oxalic acid bisamidrazone is a relatively easily oxidizable white substance which begins to decompose at about 60° C., a property which strongly hinders the polycondensation at higher temperatures. Furthermore, because an aqueous phase is used in the solvent system, the oligomers exhibiting acid halide groups as well as the organic dicarboxylic halides, insofar as they are somewhat soluble in water, can undergo saponification so that the polycondensation may be prematurely terminated. Accordingly, one should not use too high a temperature in the presence of water, preferably working below about 60° C. Otherwise, the saponification side reaction tends to inhibit the formation of the desired polymer. At temperatures below 0° C., this side reaction is of course negligible but the solubility of the oxalic acid bisamidrazone in water diminishes to such an extent as to require excessive amounts of water, therefore leading to much less favorable polycondensation conditions. The prescribed temperature conditions for the polycondensation reaction of the invention are thus carefully observed in order to achieve the best results.

In using the two phase solvent system for the process according to the invention, it is especially advantageous to conduct the polycondensation under very intensive mixing, preferably with the addition of an emulsifying agent where this facilitates an extensive and uniform intermixing of the two phases. Many different types of commercial mixing apparatus are readily available and well suited for such intensive mixing of a two phase liquid medium, e.g. a Kotthoff mixer, Waring-Blender, Star-Mix or similar devices. Depending upon the efficiency of the particular mixing equipment, one generally operates the mixer at speeds of about 500 to 15,000 revolutions per minute.

As emulsifying additives, one can employ any surfactant which is essentially inert to the reaction, preferably nonionic surfactants. The amount of the emulsifier required can be readily determined and usually amounts to only about 0.1 to 1% by weight with reference to the amount of water present. Suitable emulsifiers include:
Sodium lauryl sulfate; Lauryl pyridinium sulfate;
Emulphor El, which is a condensation product of one mol of ricinoleic acid with 40 mols ethylene oxide;
Emulphor A, which is a polyoxyethylated oleic acid;
Intrasol WL, which is a combination of sulfated and oxyethylated oils; Intrasol Mn; and the like.

A further characteristic of the polycondensation reaction is its definite exothermic character. Therefore, cooling of the reaction medium is essential in order to control the reaction temperature. Cooling also serves to draw off any frictional heat possibly caused by intensive stirring or mixing. For this withdrawal of heat, any conventional cooling system can be used, preferably one which provides indirect heat exchange with the reaction medium using suitable heat exchange fluids.

The addition of the salting out agent is essential in order to substantially completely or entirely reduce the miscibility of the organic liquid with the water, i.e. so as to separate the normally miscible organic liquid from the water and form a distinct separate phase. As the salting out agent, one can use any of the water-soluble inorganic salts commonly employed for this purpose, it being understood that one may use neutral or basic-reacting water-soluble salts which are either inert to or only favorably affect the polycondensation reaction. Thus, neutral salts will not enter into the polycondensation reaction itself but merely act to maintain the water and organic solvent in two separate phases. On the other hand, it is possible for the acid acceptor to simultaneously provide the function of the salting out agent, e.g. by using soda ($Na_2CO_3$) both as the acid acceptor and the salting out agent. In this case, it is desirable to employ water-soluble inorganic salts which are basic-reacting compounds capable of binding the liberated hydrogen halide.

The selection of the salting out agent and the amounts required, which generally depend upon the normal miscibility of the chosen organic solvent in water, can be readily determined by a simple experiment in each case. In most cases, the relative miscibility of the two phases is known to a skilled chemist or else can be determined by him in a routine manner. By way of example, the following typical salting out agents can be identified: sodium sulfate, sodium carbonate, sodium bicarbonate, sodium chloride, potassium sulfate, potassium carbonate and potassium chloride.

As the acid acceptor, it is feasible to employ inorganic or organic basic-reacting compounds, but it is particularly desirable in achieving a high molecular weight polycondensate to employ a water-soluble inorganic base or basic-reacting salt. The alkali metal carbonates or bicarbonates and especially those of sodium and potassium are considered to be especially suitable for this purpose and are relatively economical. However, strong bases such as the alkali metal hydroxides, e.g. sodium or potassium hydroxide, are also feasible where the organic solvent and the water are rendered as completely immiscible or insoluble in each other as possible and/or the reaction temperature is maintained sufficiently low. Thereby, one can still substantially avoid saponification of the dicarboxylic acid halide which remains dissolved in the liquid phase. In any case, the strength of the basic-reacting compound employed as the acid acceptor is not critical in terms of binding the hydrogen halide.

Of course, it is also possible to use a mixture of acid acceptors and/or a mixture of salting out agents, but in any case, they are preferably soluble in at least one of the two phases and for best results in the aqueous phase.

In general, a large excess of either monomeric reaction component is avoided simply for economical reasons. However, a slight excess of one component can be used without harm in the two phase solvent system, because the excess of one or the other component has no undesirable influence on the polycondensation. The amount of the added acid acceptor is naturally adjusted according to the amount of hydrogen halide split off and neutralized during the polycondensation, which in turn is dependent upon the molar amounts of the initial monomeric components being reacted. Thus, for each mol of hydrogen halide set free by the condensation, there should be used at least one equivalent of the acid acceptor, i.e. so as to bind substantially all of the hydrogen chloride or hydrogen bromide split off during the polycondensation.

The process of the invention naturally offers many possible variations in terms of the selection of organic solvents and other components in the two phase liquid reaction medium employed for the production of polyacyloxamidrazones which in each case leads to polycondensates having technically interesting molecular weights. Thus, it is a characteristic of the polycondensate products obtained by this process that they are completely insoluble in N-methyl-2-pyrrolidone, hexamethylphosphoric acid amide, dimethyl formamide and dimethyl sulfoxide. The minimum range of the reduced viscosity of the resulting polymer products, which is a measure of their molecular weight, amounts to $\eta_{red}=0.4$ to $1.2$ (measured as a solution of 1 gram of the polymer for each 100 ml. of 98% $H_2SO_4$ at 20° C.).

For the reaction of the oxalic acid bisamidrazone with any particular dicarboxylic acid halide, the molecular weight capable of being attained generally increases in each case with the increasing solubility or miscibility of the organic solvent in water. It is for this reason that the organic solvent must have a minimum solubility of at least about 8% by weight in water at 20° C., and it is of course preferable to use such organic solvents which are fully miscible with water.

Within the scope of the invention, it is possible to achieve significantly higher molecular weight products by an appropriate choice of the organic solvent and by selecting preferred acid acceptors and salting-out agents in stipulated concentrations. In this instance, the resulting molecular weight is so high that the polymer even loses its solubility in concentrated (98%) sulfuric acid. The determination of viscosity as a measure of molecular weight must then be carried out in an alkaline liquor in which the high molecular weight polycondensate still remains soluble without difficulty.

In particular, it has been found that polyacyloxamidrazones having a very high molecular weight as evidenced by a much higher viscosity are achieved, especially in the reaction of the oxalic acid bisamidrazone with terephthalic acid dichloride, when the polycondensation is carried out at temperatures of about 0° C. to 60° C. in a two phase mixture of water:tetrahydrofuran having a volumetric ratio of 3:1 to 1:3, preferably about 2:1 to 1:1, while adding 3 to 15% by weight (with reference to the water) of sodium chloride or sodium sulfate as the salting out agent, and using an alkali metal carbonate or bicarbonate as the acid acceptor, preferably sodium bicarbonate. As preferred amounts of the salting out agent, there are preferably used about 5 to 10% by weight NaCl or 7 to 11% by weight $Na_2SO_4$.

In order to achieve the best results in terms of considerably higher viscosities, it is particularly important to use a very pure tetrahydrofuran which one normally does not obtain by conventional purification methods, e.g. by distillation over alkali metals. The desired degree of purity of the tetrahydrofuran can be achieved by pretreating it with solid potassium hydroxide and then distilling it over sodium boron hydride or potassium permanganate.

By working within these prescribed conditions, e.g. with equal parts by volume of water and a pure tetrahydrofuran, using the preferred amounts of 5–10% NaCl or 7–11% $Na_2SO_4$ as the salting out agent and within a preferred temperature range of between 20° C. and 40° C., it is possible to obtain a high molecular weight polymer with a reduced viscosity which falls in the range of $\eta_{red}=4.5$ to $6.5$, measured as 1 gram of the polymer dissolved in each 100 ml. of a 10% KOH aqueous solution.

It is of course absolutely essential in achieving such higher molecular weight polymers to subject the reaction medium to an intensive mixing, preferably with the addition of an emulsifying agent. This assures a reasonably rapid rate of reaction with an exchange of materials between the two phases or a large interface or contact surface between the phases.

The polyacyloxamidrazones obtained by the process of the invention are generally useful as thermoplastic polymers capable of being shaped into various products. The achievement of a high molecular weight polymer is particularly important in forming satisfactory films or fibers. The polyacyloxamidrazones are also useful in preparing polymers which may also be considered as being linear polycondensates and which are most aptly defined as poly-bis-(1,2,4-triazoles). The polyacyloxamidrazone with the recurring units I is thus readily converted into its corresponding poly-bis-(1,2,4-triazole) by a dehydration and cyclizing reaction, i.e. a cyclodehydration, which can be accomplished by heating the initial polyacyloxamidrazone at an elevated temperature and under reduced pressure.

The invention is further illustrated by but not limited to the following examples:

EXAMPLE 1

A solution of 15.3 grams ($7.5 \times 10^{-2}$ mol) of terephthaloyl chloride in 600 ml. of dried ethyl acetate is cooled in a 3-liter glass beaker by means of an ice water bath to 5° C. After reaching this temperature, there is added a solution of 8.7 grams ($7.5 \times 10^{-2}$ mol) of oxalic bisamidrazone, 12.6 grams ($15 \times 10^{-2}$ mol) of sodium carbonate and 6 grams of sodium lauryl sulfate in 600 ml. of distilled water. This aqueous phase is introduced into the organic phase in the form of a jet while strongly mixing the two phases with a Kotthoff mixer operated at 1400 r.p.m. After a period of 10 minutes of mixing time while further cooling with ice water to maintain the temperature at about 5° C., the heavily swollen or expanded polycondensate is filtered off, washed once with methanol, twice with water and then once again with methanol. The washing fluids remaining in the polymer are azeotropically distilled off with the assistance of ligroin. The polymer is then dried in a vacuum drying chamber at 80° C.

The polycondensate product had a reduced viscosity of $\eta_{rel}=1.07$, measured at 20° C. and a concentration of 1 gram of polymer per 100 ml. of concentrated sulfuric acid (98%).

EXAMPLE 2

A solution of 3.83 grams ($2.5 \times 10^{-2}$ mol) of fumaric acid dichloride in 200 ml. of dried ethyl acetate is cooled by means of an ice water bath while contained in a 1-liter glass beaker to a temperature of 10° C. Thereupon, under rapid mixing with a Kotthoff mixer operated at 1400 r.p.m., a solution of 2.9 grams ($2.5 \times 10^{-2}$ mol) of oxalic acid bisamidrazone, 4.2 grams ($5 \times 10^{-2}$ mol) of sodium bicarbonate and 2 grams sodium lauryl sulfate are added as a fluid jet into the acetate solvent. After 10 minutes mixing time together with continuous cooling, the polycondensate is filtered off, at first washed with methanol, then washed two times with water and finally once again washed with methanol. The washing fluids retained in the polymer are azeotropically distilled off as in the preceding example with the aid of ligroin. The product is then dried in a vacuum drying chamber at 80° C.

The reduced viscosity of the polycondensate obtained in this manner amounted to 0.45, measured at 20° C. and a concentratiton of 1 gram of polymer per 100 ml. of 98% sulfuric acid.

EXAMPLE 3

5.1 grams ($2.5 \times 10^{-2}$ mol) of terephthaloyl chloride is dissolved in 200 ml. of water-free tetrahydrofuran and while mixing in a mixer operated at 13,000 r.p.m. introduced rapidly at room temperature into a solution of 2.9 grams ($2.5 \times 10^{-2}$ mol) of oxalic acid bisamidrazone and 2.65 grams of water-free sodium carbonate in 200 ml. water. The immediately precipitating polymer is centrifuged off, washed several times with water and alcohol (methanol) and finally freed of residual wash fluids by azeotropic distillation with octane.

After drying under a vacuum as in the preceding examples, the resulting polycondensate had a reduced viscosity of 1.04, measured as in the preceding examples.

Using the same procedure as in the three preceding examples but employing different solvents, similar results have been achieved as shown in the following table:

TABLE I

| | Example 4 | Example 5 |
|---|---|---|
| 1st phase: | | |
| Solvent | Water | Water. |
| Monomer | Oxalic bisamidrazone | Oxalic bisamidrazone. |
| Acid acceptor | Sodium carbonate | Sodium bicarbonate. |
| Salting out agent. | Sodium sulfate | Sodium sulfate. |
| Emulsifier | Sodium lauryl sulfate | |
| 2nd Phase: | | |
| Solvent | Hexamethylphosphoric acid amide | 1,4-dioxane. |
| Monomer | Terephthalic acid dichloride. | Terephthalic acid dichloride. |
| Reaction temp., ° C. | 25 | 30 |
| Viscosity $\eta_{(red)}$. | 0.95 | 1.20 |

EXAMPLE 6

7.8 grams of oxalic acid bisamidrazone are rapidly dissolved in 375 ml. of water at a temperature of 35–40° C., the water having been boiled under a nitrogen atmosphere. The solution is introduced into a mixing vessel, and to this there is added a solution of 12.7 grams sodium bicarbonate and 56.25 grams sodium chloride (7.5% by weight with reference to the total water) in 375 ml. of water. Then, with strong mixing, a solution of 15.37 grams terephthaloyl-chloride in 750 ml. tetrahydrofuran is introduced in the form of a jet. The mixing vessel is cooled for removal of the heat of reaction. After a mixing time of 10 minutes at about 35° C., the polymer suspension is freed from the tetrahydrofuran by distillation. The precipitated polymer product is filtered off and washed three times with water and then with methanol. The wash liquid remaining in the polymer is azeotropically distilled off with ligroin. The product is dried in a vacuum at 70° C.

The reduced viscosity of 1 gram of this polyterephthaloyloxamidrazone product in 100 ml. of a 10% aqueous solution of KOH, measured at 20° C., amounts to 5.4.

EXAMPLE 7

11.6 grams of oxalic acid bisamidrazone are dissolved in 500 ml. water at 40° C. and mixed while stirring with a solution of 16.95 grams sodium bicarbonate and 75 grams of sodium chloride in 500 ml. of water. With further intensive mixing at 40° C., a solution of 20.5 grams terephthaloyl dichloride in 500 ml. tetrahydrofuran are added thereto. After a mixing time of 10 minutes while withdrawing the heat of reaction to maintain a temperature of about 40° C., the precipitated polymer is worked up and purified in the same manner as Example 6. The resulting product has a reduced viscosity of 4.64, measured as in Example 6.

Following exactly the same procedure as in Example 6, further reactions have been carried out with the use of either sodium sulfate or sodium chloride as the salting out agents but in varying amounts. In each case, the amounts of the monomers were the same, i.e. 7.8 grams oxalic acid bisamidrazone and 15.37 grams terephthaloyl chloride.

TABLE II

| Ex. | Water (ml.) | Tetrahydrofuran (ml.) | Sodium sulfate | | Sodium chloride | | Viscosity ($\eta_{red}$) |
|---|---|---|---|---|---|---|---|
| | | | Gms. | Percent by wt. | Gms. | Percent by wt. | |
| 8 | 750 | 750 | 75 | 10 | | | 4.0 |
| 9 | 750 | 750 | | | 90 | 12 | 4.2 |
| 10 | 750 | 750 | | | 105 | 14 | 3.3 |

The tetrahydrofuran used in Examples 6–10 was highly purified by first shaking it for three hours with a strong caustic potash solution (KOH) and then distilling it over sodium boron hydride. After this treatment, the tetrahydrofuran is completely free of peroxides and does not contain any impurities which could have an unfavorable effect upon the polycondensation.

The invention is hereby claimed as follows:

1. A process for the production of a polyacyloxamidrazone having recurring units of the formula

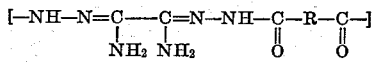

which comprises:
reacting oxalic acid bisamidrazone with an organic dicarboxylic acid halide of the formula

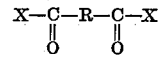

wherein X is a member selected from the group consisting of chlorine and bromine and R is a divalent hydrocarbon radical of at least two up to about 12 carbon atoms, said reaction being carried out in a two phase solvent medium consisting essentially of water and an organic solvent selected from the class consisting of ethyl acetate, tetrahydrofuran, hexamethylphosphoric acid triamide, dioxane, 1,2-dimethylglycol carbonate acetonitrile and malonic acid diethyl ester, said solvent medium containing a salting out agent sufficient to render said organic solvent substantially immiscible with the water, with mixing and in the presence of an acid acceptor while withdrawing the heat of reaction to maintain a temperature of about 0° C. to 60° C.; and
isolating the reaction product from the solvent medium.

2. A process as claimed in claim 1 wherein the reaction temperature is maintained at about 10° C. to 40° C.

3. A process as claimed in claim 1 wherein the salting out agent is at least one compound selected from the class consisting of sodium sulfate, sodium carbonate, sodium bicarbonate, sodium chloride, potassium sulfate, potassium carbonate and potassium chloride.

4. A process as claimed in claim 1 wherein said organic dicarboxylic halide has the formula

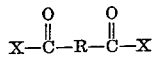

wherein X is chlorine and R is a hydrocarbon radical of 2 to 6 carbon atoms.

5. A process as claimed in claim 1 wherein said organic dicarboxylic halide is terephthalic acid dichloride.

6. A process as claimed in claim 1 wherein said organic dicarboxylic halide is fumaric acid dichloride.

7. A process as claimed in claim 1 wherein the acid acceptor is a water-soluble, basic-reacting salt.

8. A process as claimed in claim 1 wherein the acid acceptor also functions as the salting out agent.

9. A process as claimed in claim 8 wherein sodium carbonate is employed both as the acid acceptor and the salting out agent.

10. A process as claimed in claim 1 wherein the organic solvent is hexamethylphosphoric acid triamide and the salting out agent is sodium sulfate.

11. A process as claimed in claim 1 wherein said two phase solvent medium consists of water:tetrahydrofuran in a volumetric ratio of about 3:1 to 1:3.

12. A process as claimed in claim 11 wherein the salting out agent is a compound selected from the class consisting of sodium chloride and sodium sulfate employed in an amount of about 3 to 15% by weight with reference to the water.

13. A process as claimed in claim 12 wherein the acid acceptor is a compound selected from the group consisting of sodium carbonate and sodium bicarbonate.

14. A process as claimed in claim 1 wherein the organic dicarboxylic acid halide is terephthalic acid dichloride, the two phase solvent medium consists of water: tetrahydrofuran in a volumetric ratio of about 1:1 to 2:1, the salting out agent is sodium chloride in an amount of about 5 to 10% by weight with reference to the water, and the acid acceptor is sodium bicarbonate.

15. A process as claimed in claim 1 wherein the organic dicarboxylic acid halide is terephthalic acid dichloride, the two phase solvent medium consists of water: tetrahydrofuran in a volumetric ratio of about 1:1 to 2:1, the salting out agent is sodium sulfate in an amount of about 7 to 11% by weight with reference to the water, and the acid acceptor is sodium bicarbonate.

References Cited

UNITED STATES PATENTS

| 3,130,182 | 4/1964 | Frazer | 260—78 |
| 3,376,267 | 4/1968 | Pruckmayr | 260—78 |
| 3,389,122 | 6/1968 | Culbertson | 260—47 |

OTHER REFERENCES

Journal of Polymer Science, Pt.B., vol. 4, 1966, pp. 869–873, SAGA et al.

Chem. Abstracts, 1967, vol. 67, 117411 j. SAGA et al.

WILLIAM H. SHORT, Primary Examiner

H. SCHAIN, Assistant Examiner